(12) United States Patent
Sezginer

(10) Patent No.: US 8,549,458 B2
(45) Date of Patent: Oct. 1, 2013

(54) METHOD, SYSTEM, AND PROGRAM PRODUCT FOR ROUTING AN INTEGRATED CIRCUIT TO BE MANUFACTURED BY SIDEWALL-IMAGE TRANSFER

(75) Inventor: Abdurrahman Sezginer, Monte Sereno, CA (US)

(73) Assignee: Cadence Design Systems, Inc., San Jose, CA (US)

(*) Notice: Subject to any disclaimer, the term of this patent is extended or adjusted under 35 U.S.C. 154(b) by 209 days.

(21) Appl. No.: 12/614,911

(22) Filed: Nov. 9, 2009

(65) Prior Publication Data

US 2011/0113393 A1 May 12, 2011

(51) Int. Cl.
*G06F 17/50* (2006.01)
(52) U.S. Cl.
USPC ............ 716/126; 716/110; 716/118; 716/119
(58) Field of Classification Search
USPC .......................................................... 716/126
See application file for complete search history.

(56) References Cited

U.S. PATENT DOCUMENTS

| | | | | |
|---|---|---|---|---|
| 4,890,238 A * | 12/1989 | Klein et al. | ................... | 716/124 |
| 7,913,197 B1 | 3/2011 | Kruger et al. | | |
| 2008/0005713 A1 | 1/2008 | Singh et al. | | |
| 2008/0077900 A1* | 3/2008 | Oh et al. | ......................... | 716/11 |
| 2008/0307381 A1* | 12/2008 | Tritchkov et al. | ............... | 716/11 |
| 2010/0199253 A1 | 8/2010 | Cheng et al. | | |
| 2011/0014786 A1 | 1/2011 | Sezginer et al. | | |
| 2011/0113393 A1 | 5/2011 | Sezginer | | |

OTHER PUBLICATIONS

Conley et al. "From Simulation to Characterization—Integrated Approach for Self Aligned Double Patterning Defectivity," Semiconductor Manufacturing (ISSM), 2008 International Symposium on. 2008. pp. 11-14.*
Non-Final Office Action dated Jan. 17, 2012 for U.S. Appl. No. 12/582,366.
Non-Final Office Action dated Nov. 9, 2011 for U.S. Appl. No. 12/719,710.
Wiaux, V., "Split and Design Guidelines for Double Patterning," Proceedings of SPIE vol. 6924, p. 692409-1, SPIE, Bellingham, WA, 2008.
Maenhoudt, M., et al., "Alternative process schemes for double patterning that eliminate the intermediate etch step," Proceedings of SPIE vol. 6924 69240P-1, SPIE, Bellingham, WA, 2008.
Ghan, J, et al, for U.S. Appl. No. 12/189,692, filed Aug. 11, 2008.
Weling et al., for U.S. Appl. No. 12/264,853, filed Nov. 4, 2008.
Weling et al., for U.S. Appl. No. 12/264,139, filed Nov. 3, 2008.

(Continued)

*Primary Examiner* — Paul Dinh
*Assistant Examiner* — Bryce Aisaka
(74) *Attorney, Agent, or Firm* — Vista IP Law Group, LLP

(57) ABSTRACT

Disclosed is a method, apparatus, and program product for routing an electronic design using sidewall image transfer that is correct by construction. The layout is routed by construction to allow successful manufacturing with sidewall image transfer, since the router will not allow a routing configuration in the layout that cannot be successfully manufactured with a two-mask sidewall image transfer. A layout is produced that can be manufactured by a two-mask sidewall image transfer method. In one approach, interconnections can be in arbitrary directions. In another approach, interconnections follow grid lines in x and y-directions.

30 Claims, 22 Drawing Sheets

(56) References Cited

OTHER PUBLICATIONS

Huckabay et al., for U.S. Appl. No. 12/272,550, filed Nov. 17, 2008.
Bencher, C., "SADP: The Best Option for 32nm NAND Flash," Nanochip Technology Journal, Issue 2, 2007.
Fonseca, C. et al., "Advances and challenges in dual-tone development process optimization," Proc. SPIE 7274, 727401, Feb. 24, 2009.
Final Office Action dated Jun. 25, 2012 for U.S. Appl. No. 12/582,366.
Final Office Actioin dated Mar. 26, 2012 for U.S. Appl. No. 12/719,710.
Non-Final Office Action dated May 31, 2013 for U.S. Appl. No. 12/582,366.

* cited by examiner

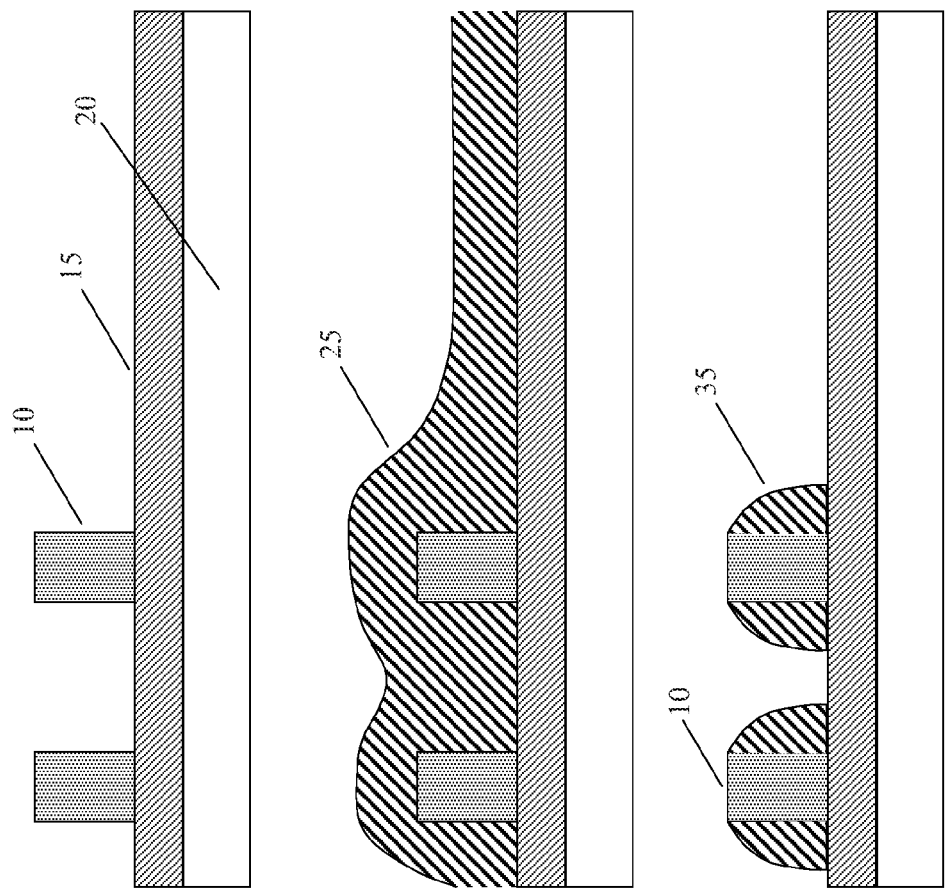

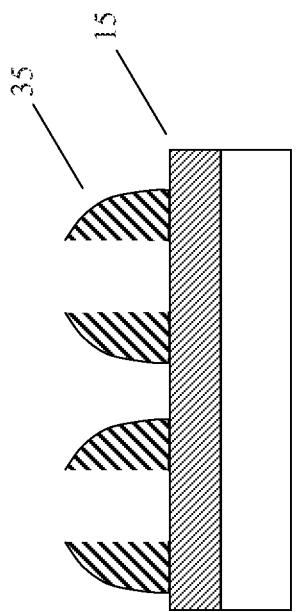
Fig. 1d. Cross-section after removing the core
(PRIOR ART)
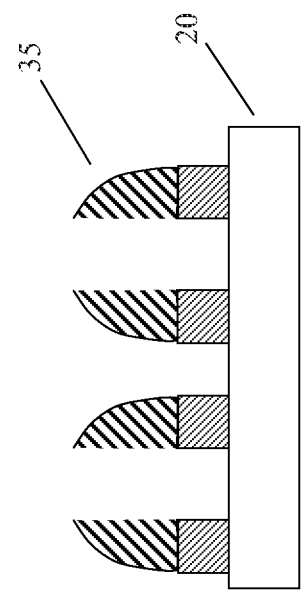
Fig. 1e. Spacer pattern etched into an underlying layer
(PRIOR ART)
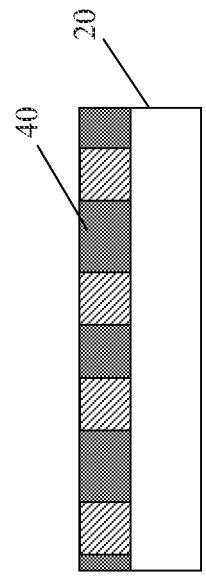
Fig. 1f. Metal is filled into trenches.
(PRIOR ART)

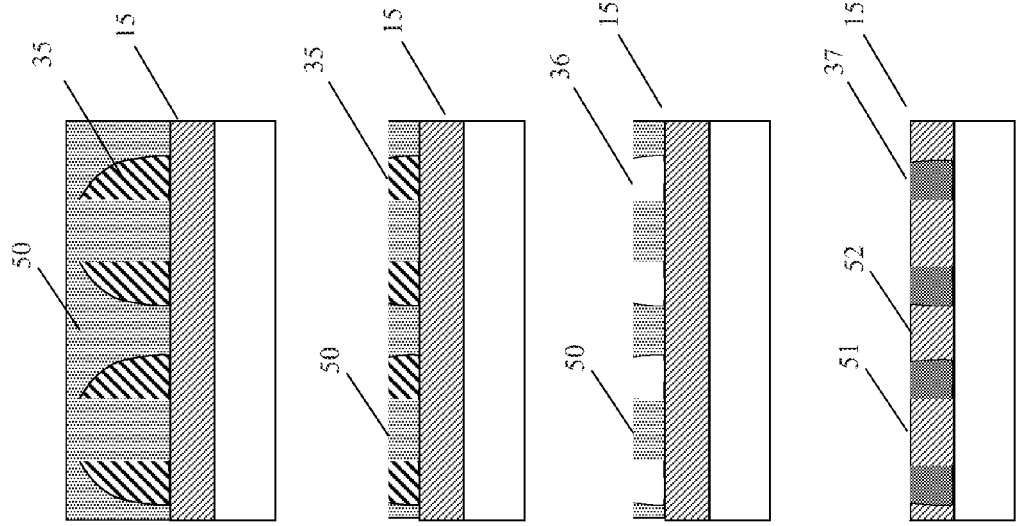
Fig. 2d. Cross-section after deposition of more core material (PRIOR ART)
Fig. 2e. Spacers and core material after a CMP process (PRIOR ART)
Fig. 2f. Spacers are etched away. (PRIOR ART)
Fig. 2g. Spacer pattern is transferred as a trench pattern into a dielectric layer and the trenches are filled with metal. (PRIOR ART)

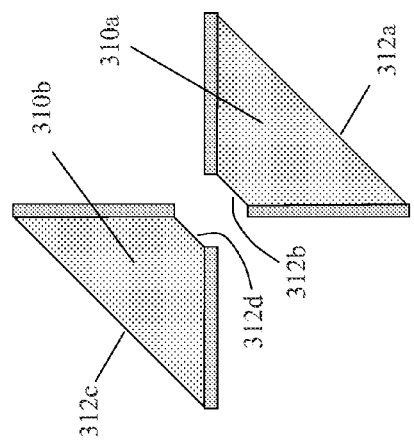
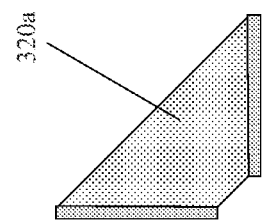
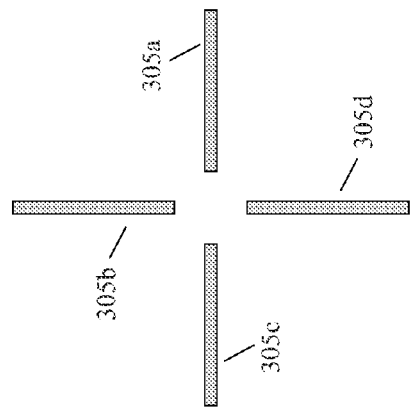

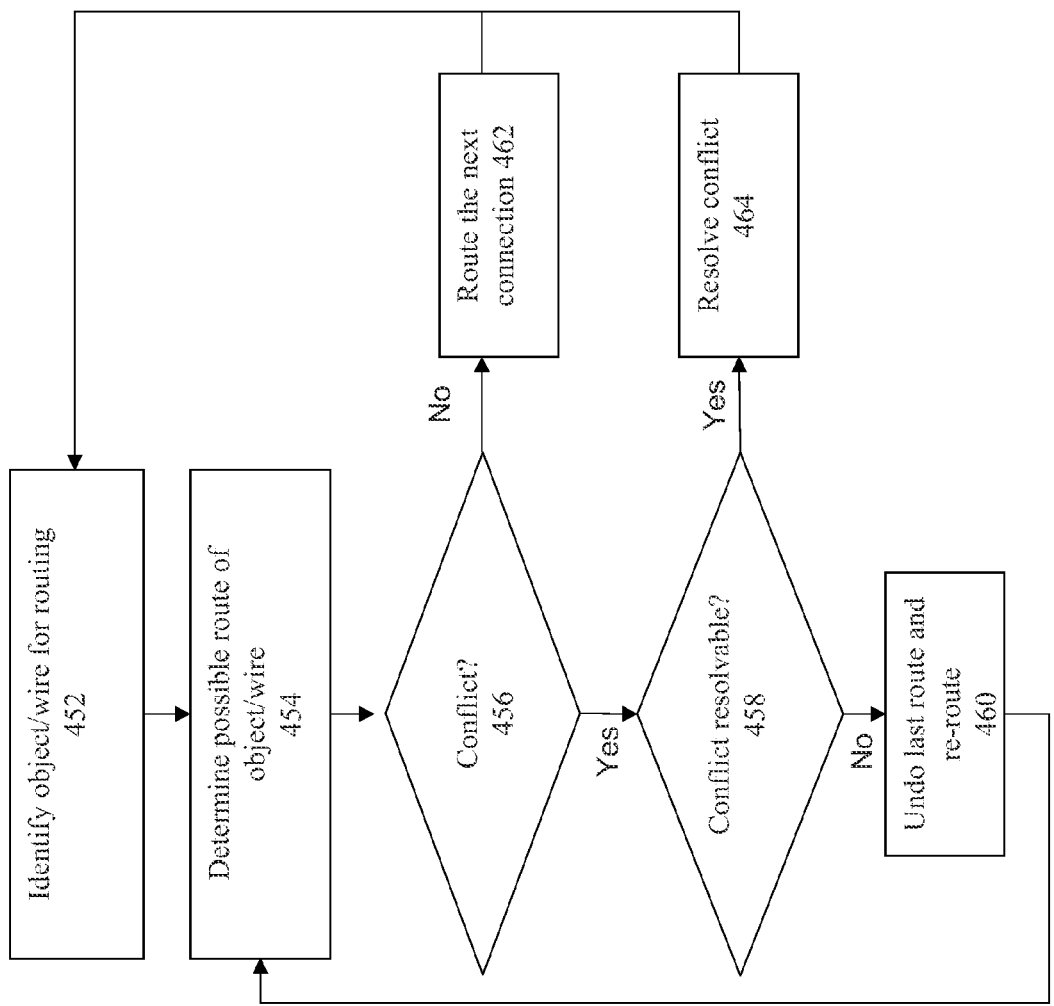

Fig. 6f

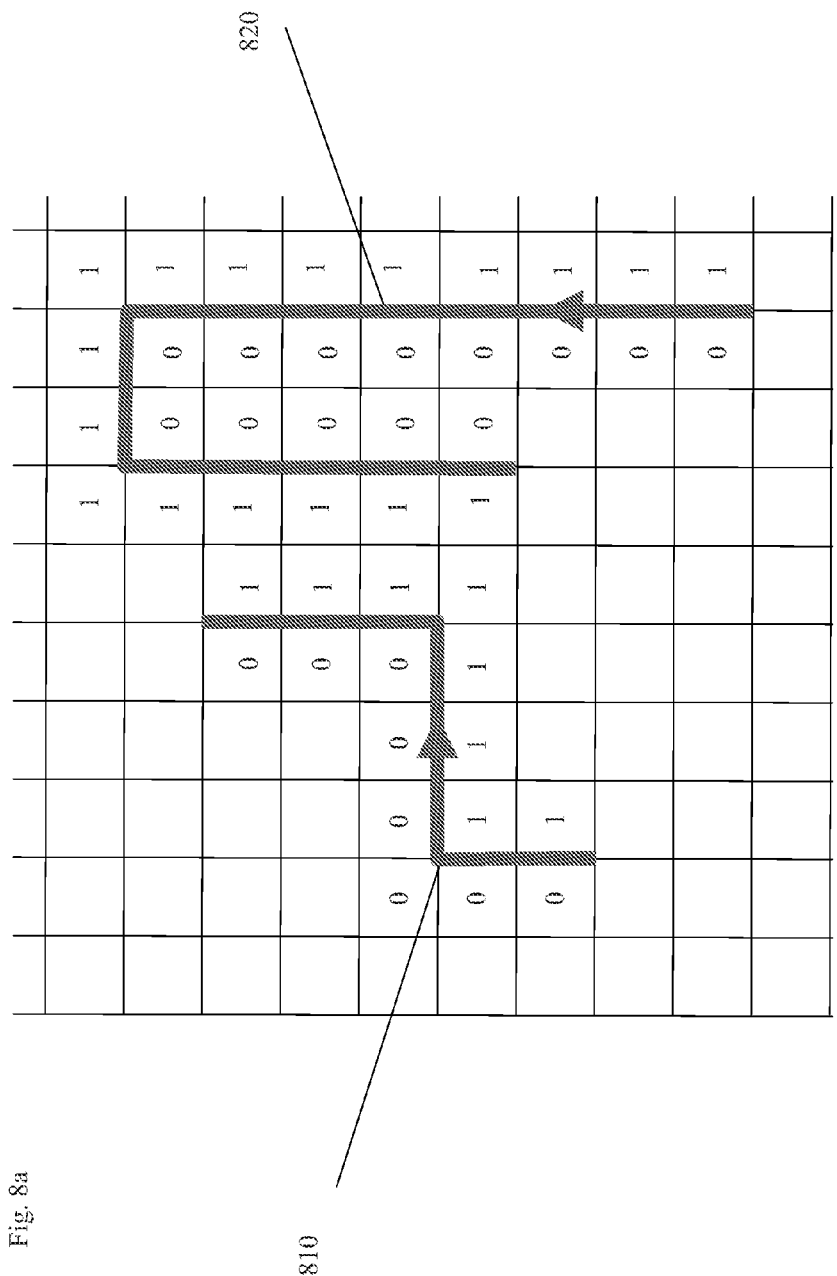
Fig. 8a
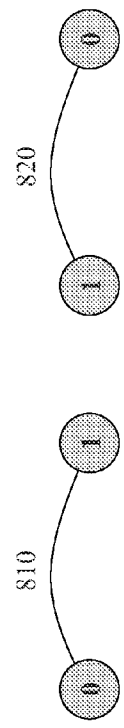
Example with disjoint graphs

METHOD, SYSTEM, AND PROGRAM PRODUCT FOR ROUTING AN INTEGRATED CIRCUIT TO BE MANUFACTURED BY SIDEWALL-IMAGE TRANSFER

TECHNICAL FIELD

This invention concerns electronic design automation for routing interconnections of an integrated circuit that is manufactured using a sidewall image transfer double patterning method.

DESCRIPTION OF THE RELATED ART

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

A layout file is then created using the netlist. This is accomplished through a placing and routing process, which assigns logic cells to physical locations in the device layout and routes their interconnections. The physical layout is typically described as many patterned layers, and the pattern of each layer is described by the union of a set of polygons. The layout data set is stored, for example in GDSII ("Graphic Data System II") or OASIS ("Open Artwork System Interchange Standard") formats. Component devices and interconnections of the integrated circuit are constructed layer by layer. A layer is deposited on the wafer and then it is patterned using a photolithography process and an etch process. One or more photomasks are created from the layout file for the photolithography of each layer. Photomasks are used to transfer the layout pattern onto the physical layer on the wafer. A photomask, or mask, provides an image of the desired physical geometries of the respective integrated circuit layer. Passing light through the mask projects the layout pattern for the layer onto the wafer. An imaging lens system projects and focuses the layout onto the substrate. The projected light pattern interacts with a photosensitive resist coating on the wafer and, resist portions that are exposed to light are rendered either soluble or insoluble in a developer solution, depending on the type of the photoresist. Accordingly, the mask pattern is transferred into the photo-resist by optical projection and chemical reactions. The photo-resist pattern is subsequently transferred to an underlying layer by an etch process. Most commonly, plasma containing chemically-selective reactive ions is used to etch high-aspect ratio trenches and holes with close to vertical sidewalls.

With a continuing desire to provide greater functionality in smaller packages and the evolution of system-on-chip and mixed-signal designs, IC feature geometries are being driven to smaller and smaller dimensions. However, the ability to project an accurate image of increasingly smaller features onto the wafer is limited by the wavelength of the light used, and the ability of the lens system.

One class of technologies used to enhance feature density is referred to as double patterning or multiple patterning. There are several types of double patterning in use, the most common being: litho-etch-litho-etch (LELE); litho-freeze-litho-etch (LFLE); self-aligned double patterning (SADP), also known as spacer-assisted double patterning, or sidewall image transfer (SIT).

Such techniques may be used to enhance feature density, e.g., using some type of sidewall image transfer. However, there are limitations to conventional approaches to implement sidewall image transfer. For example, conventional approaches to implementing sidewall image transfer may fail if a closed path that starts at a point and returns to the same point can be drawn in the plane of a layout such that the closed path crosses an odd number of sidewalls. This is an example of a "coloring problem" that makes the electronic design unfeasible to manufacture, and therefore a design layout that has already been routed in this manner may not be amenable to manufacturing with sidewall image transfer in a successful or cost effective way.

SUMMARY

Embodiments of the present invention provide a method, apparatus, and program product for routing an electronic design using sidewall image transfer that is correct by construction. As previously noted, conventional approaches to implementing sidewall image transfer may fail since the design layout that has already been routed may not be amenable to manufacturing with sidewall image transfer in a successful or cost effective way. Using embodiments of the present invention, the layout is routed by construction to allow successful manufacturing with sidewall image transfer, since the router will not allow a routing configuration in the layout that cannot be successfully manufactured with a two-mask sidewall image transfer. Embodiments of the present invention produce a layout that can be manufactured by a two-mask sidewall image transfer method. In one embodiment, interconnections can be in arbitrary directions. In another embodiment interconnections follow grid lines in x and y-directions.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIGS. 1a-c show steps of self-aligned double patterning in cross-section view according to related art.

FIGS. 1d-f show steps of wire-by-trench variant of self-aligned double patterning in cross-section view according to related art.

FIG. 2d-g show steps of wire-by-spacer variant of self-aligned double patterning in cross-section view according to related art.

FIG. 3a-c illustrate non-uniqueness of the coloring problem.

FIG. 4a shows a flowchart of a process for placement of a layout object according to some embodiments of the invention.

FIG. 6a-f show routing of interconnections according to an embodiment of this invention.

FIG. 8a-c shows a method of resolving conflicts according to an embodiment of this invention.

DETAILED DESCRIPTION OF THE EMBODIMENTS OF THE INVENTION

Figure 3D:
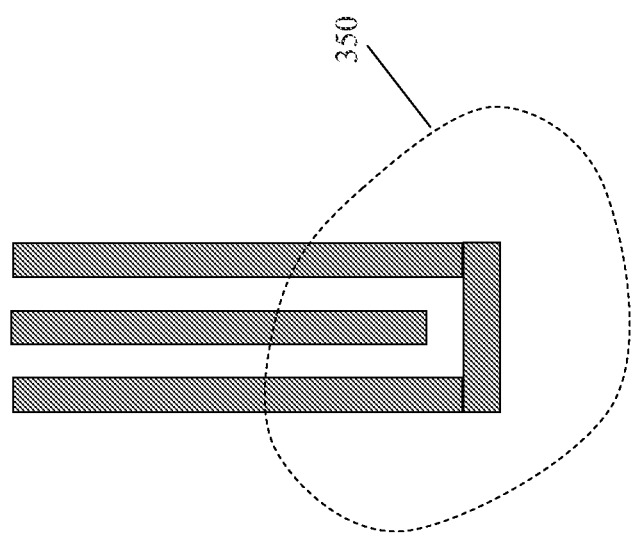
FIG. 3d illustrates a potential coloring conflict.

Embodiments of the present invention provide a method, apparatus, and program product for routing an electronic design using sidewall image transfer that is correct by construction.

As noted above, conventional approaches to implementing sidewall image transfer may fail since the design layout that has already been routed may not be amenable to manufacturing with sidewall image transfer in a successful or cost effective way. Using the present invention, the layout that has been routed will by construction be designed to allow successful manufacturing with sidewall image transfer, since the router will not allow a routing configuration in the layout that cannot be successfully manufactured with a two-mask sidewall image transfer.

To explain the problem being addressed by embodiments of the invention, consider that the minimum feature size that a projection system can print can be expressed by:

$$CD = k_1 \frac{\lambda}{NA}$$

where CD, critical dimension, is the minimum feature size; $k_1$ is a dimensionless coefficient of process-related factors; $\lambda$ is the wavelength of light used; and NA is the numerical aperture of the projection lens as seen from the wafer. The equation above is not a black-and-white absolute limit. The yield of the lithographic process gradually decreases, and its cost increases, as $k_1$ decreases below 0.35. Reducing $k_1$ below 0.28 for a single exposure is not practical. There is a fundamental, hard limit for the pitch of a periodic pattern:

$$\text{Period} \geq 0.5 \frac{\lambda}{NA}$$

The pitch limit cannot be violated, irrespective of the photomask and resolution enhancement technologies that may be used, when using a resist employing a single-photon reaction. The reason for this limitation is that the optical intensity image produced inside the photo-resist is band-limited in the spatial-angular-frequency domain. When the intensity image is Fourier transformed with respect to the x and y coordinates (coordinates in the plane of the wafer), the support of the transformed intensity image is contained in a disk of radius $4\pi NA/\lambda$. Patterns that can be printed by a single lithography step are approximately level curves of such band-limited functions.

Presently, the most advanced high-volume lithography technology uses 193 nm wavelength Argon fluoride (ArF) excimer laser as a light source and a projection lens with 1.35 numerical aperture, which cannot print pitches smaller than 67 nm in a single lithography step. Accordingly, the resolution limit of conventional lithography technology is increasingly being challenged by the shrinking dimensions of critical IC feature geometries.

Double Patterning:

One class of technologies used to enhance feature density is referred to as double patterning or multiple patterning. There are several types of double patterning in use, the most common being: litho-etch-litho-etch (LELE); litho-freeze-litho-etch (LFLE); self-aligned double patterning (SADP), also known as spacer-assisted double patterning, or sidewall image transfer (SIT).

SADP (SIT) method is a known method of double patterning [C. Bencher, "SADP: The Best Option for 32 nm NAND Flash," Nanochip Technology Journal, Issue 2, 2007]. Referring to FIGS. 1a-c, in the SADP method, a core (also called mandrel) pattern 10 is formed on a wafer by a lithography and an etch process (FIG. 1a). The core pattern 10 is formed on a dielectric layer 15 which is deposited on a wafer 20. A spacer material 25, for example $Si_3N_4$, is deposited on the core pattern (FIG. 1b). The spacer material is etched by a plasma process in a way that etches horizontal surfaces faster. FIG. 1c shows the cross-section of the wafer after the spacer-etch process. Sidewalls of features (islands) in the core pattern 10 are covered by spacers 35.

Wire-by-Trench Variant of SADP:

In wire-by-trench SADP process, the spacer pattern defines the dielectric between metal connections. Core pattern 10 is removed by a chemically selective etch process, leaving behind sidewall spacers 35 (FIG. 1d). The sidewall spacer pattern is transferred to the dielectric layer 15 using an etch process (FIG. 1e). There may be one or more hardmask layers between the spacers 35 and the dielectric layer 15. In that case, the spacer pattern is transferred into the dielectric layer 15 using multiple etch processes. Trenches are formed in the dielectric layer. Via holes (not shown) are etched at this step in the dual damascene process. Trenches and vias holes are filled by metal. In the damascene process, trenches are coated by barrier and seed layers, and copper is electro-deposited into the trenches and vias. Excess copper is removed by a CMP (chemical-mechanical planarization) leaving copper only in the trenches (FIG. 1f).

Wire-by-Spacer Variant of SADP:

In wire-by-spacer SADP process, the spacer pattern defines the metal interconnection pattern. The conceptually simplest way of achieving this would be to make the spacers out of metal. This is not practiced because there isn't a good etch process for copper, the interconnection metal preferred for its high conductance. Wire-by-trench method follows the steps of FIG. 1a-c. Then, the spacers are covered by the core material 50, or a chemically similar material, shown in FIG. 2d. This deposition fills the spaces between the spacers 35. The spacers and core material are thinned by CMP (FIG. 2e) to make the cross-section of the spacers more rectangular. The spacers are removed by a chemically selective etching process (FIG. 2f). Where the spacers 35 were, are now trenches 36. The trench pattern is transferred by an etch process to the dielectric layer that will support the wires. Via holes (not shown) are etched at this step according to the dual damascene process, using a separate lithography and etch step. Trenches in the dielectric layer 37 and via holes are filled with metal. Finally, in the position of the spacers, is metal 37; and in the position of the core 51, and spaces between spacers 52, is dielectric.

Dual Tone Developer Method:

There is a lithography process where the portions of photoresist that are exposed to UV radiation below a first energy density $E_1$ (measured in Joules/m$^2$), and above a second energy density $E_2$ are both dissolved. Only portions of photoresist that are exposed to an energy density between two thresholds $E_1$ and $E_2$ remain after the dual-tone development process [C. Fonseca et al., "Advances and Challenges in Dual-Tone Development Process," Proceedings of SPIE Vol. 7274, p. 727401-12, SPIE, Bellingham, Wash., 2009; A. P. G. Robinson, et al. report a reverse-tone dual-developer process in "10 nm scale electron beam lithography using a triphenylene derivative as a negative/positive tone resist," J. Phys. D: Appl. Phys. Vol. 32, No. 16, L75-78, August 1999]. The remaining resist pattern, which is transferred to a hard mask by an etch process, follows the perimeter of bright features in the lithography image. The resulting pattern is similar to the pattern of spacers formed on sidewalls of the core pattern. The dual-tone developer process and the sidewall spacer process produce topologically similar patterns. Therefore, they can both be classified as sidewall image transfer methods. Limitations of Sidewall Image Transfer: Patterns formed by sidewalls are subject to topological restrictions. The restriction that is most readily appreciated is that sidewalls cannot form a T-junction. In general, alternating spaces between sidewalls need to be formed by core features. Forming a given pattern of line segments by sidewalls is similar to coloring a geographical map using two colors such that no two neighboring countries have the same color. The sidewalls are analogous to the boundaries between countries, and the two colors of the map are analogous to the two states of being a core feature (an island, or mesa) or non-core (a trench). By analogy, assigning core features to regions encircled by line features in the layout can be called "coloring the layout." Spaces between sidewalls that are assigned a first "color" are formed by core features, and the spaces between sidewalls that are assigned a second color are formed by the absence of core features. In this terminology, color is merely an indicator of the presence of a core feature; it is not a physical color. Referring to FIG. 3a, line segments 305a-d will be formed by sidewalls. There is more than one way to color the spaces between the lines. For example, core features 310a-b in FIG. 3b is possible one solution. Unwanted portions 312a-d of sidewalls are eliminated by a second lithography step using a trim mask. The coloring solution is not unique. FIG. 3c shows another example solution having core features 320a-b.

If a closed path that starts at a point and returns to the same point crosses an odd number of sidewalls, such as path 350 in FIG. 3d, the coloring problem is not feasible. Such sets of features can be called odd cycles or color conflicts. Odd cycles can be arbitrarily large both in physical extent and in number of features. Some odd cycles can be resolved if one of the spaces is large enough to be broken into two, by inserting a dummy sidewall to be later removed by the trim mask. This is only feasible if the space to be broken is wide enough to accommodate a core feature and a non-core region, both to be resolved by a single lithography step. Presence of odd cycles cannot be checked by a local operation. In this case, "local" means limited to a neighborhood of the wafer (x-y) plane, such that the diameter of the neighborhood is less than several times (e.g. 5 times) the minimum feature dimension. Similarly, if an odd cycle is detected, it cannot necessarily be repaired by a local operation without creating another odd cycle. If a layout is created disregarding limitations of the sidewall image transfer method, producing the core mask and trim mask without any coloring conflicts may not be feasible using reasonable computational time and resources.

Damascene Process: Damascene process is used to make copper interconnections in integrated circuits. In the damascene process, interconnections are etched as trenches into a dielectric layer, such as $SiO_2$ or TEOS. The trenches are lined with a thin film of a diffusion barrier such as titanium nitride or tantalum nitride. The barrier film prevents metal atoms from diffusing into the dielectric. Trenches are then lined with a thin film of conductive layer that seeds electro-deposition. The barrier and seed layers are typically deposited by a physical or chemical vapor deposition. The trenches are filled with a metal, typically copper, by a wet electro-deposition process. Electro-deposition not only fills the trenches but coats the wafer with an excess layer of metal. Excess metal is removed by chemical-mechanical planarization, which leaves metal only in trenches and vias. Metal trenches (wires) at different layers are connected by vertical interconnections called vias. Vias are made by etching holes in a dielectric layer and filling the holes with metal. Dual damascene process etches a layer of trenches and a layer of via holes, in two separate lithography steps. Vias are etched deeper than the trenches, down to the previous metal layer. There is a trench-first dual damascene process and a via-first dual damascene process. In either variant of the dual damascene process, via holes and trenches are metal filled in one set of barrier, seed, and metal depositions. Conventionally, the trench layer is patterned with a single lithography step, and associated via holes are patterned with another single lithography step. Manufacturing of logic devices below the 22 nm node may require double patterning of either or both of the trench layer and the via hole layer.

Single-Cut and Double-Cut Vias:

Some wires on adjacent routing layers are connected by vias. Vias can be single-cut or double-cut. A single-cut is usually drawn as a square, but reproduces having approximately a circular cross-section in the x-y plane due to the limited resolution of lithography. In three dimensions, a single cut via is approximately a circular cylinder. The diameter of a single-cut via is comparable to the width of a wire (trench). Single-cut vias have some probability of being either open circuit or having an unacceptably high resistance due to variations in lithography, etch, and deposition processes. Double-cut vias are used to lower the probability of having poorly connected vias. A double-cut via is either two adjacent vias connected in parallel, or preferably one via that is drawn having a rectangular cross-section, which is rendered as an oblong cross-section by lithography. The long dimension of a rectangular double-cut via is two times the wire width or greater, and its short dimension is comparable to the wire width. Where wires in adjacent layers have alternating preferred directions, a double-cut via necessarily has its long direction perpendicular to the preferred direction of one of the two layers it connects.

Embodiments of the present invention can be used to produce a layout that can be manufactured by a two-mask sidewall image transfer method, and which is therefore correct by construction. In one embodiment, interconnections can be in arbitrary directions. In another embodiment interconnections follow grid lines in x and y-directions.

FIG. 4a shows a general flowchart of a process for producing a layout according to come embodiments of the invention which by upfront design will be manufacturable with double patterning procedures. At 452, the process identifies a specific object or wire of the electronic design for placement onto the layout. For routing applications of the invention, the object would be a wire or interconnect to be routed.

At 454, the object is placed onto the layout at a proposed location. Any suitable approach can be taken to perform the initial placement of the wire. For example, the initial placement of the wire can be a conventional approach such as is obtained by using the Maze algorithm.

A determination is made at 456 whether the placement of the object creates a conflict. As described in more detail below, different double patterning implementations may utilize different algorithms to identify conflicts. In particular, set of rules can be implemented that determine whether the legality for the placement of the layout object, where the rules are configured to guarantee successful manufacture of the design for the given double patterning process. Therefore, a conflict is identified if there is a violation of one or more rules at 456.

If a conflict is identified, then a determination is made at 458 whether the conflict is resolvable. For example, under certain circumstances explained below, an illegal placement can be resolved by changing the colors in a subgraph to an opposite "color." As previously described, alternating spaces between sidewalls are formed by core features, where forming a given pattern of line segments by sidewalls is similar to coloring a geographical map using two colors such that no two neighboring countries have the same color. Therefore, sidewalls are analogous to the boundaries between countries, and the two colors of the map are analogous to the two states of being a core feature (an island, or mesa) or non-core (a trench). If the identified conflict is caused by incompatible colors for nearby or adjacent wires, then the conflict may be resolved if the wire having the incompatible color is changed to another color. Of course, this solution may only be taken if the color change does not itself cause another conflict.

If the conflict cannot be resolved, then at 460 the placement of the object is reversed and re-routing of the wire is performed. Since the present context can be implemented in a recursive process, re-routing the last wire is performed to resolve the identified conflict with an alternate configuration that does not create a conflict. Therefore, the process returns back to 454 to identify another proposed placement of the object/wire.

If the conflict is resolvable, then the conflict is resolved at 464. The process then returns to 452 to identify another object/wire for placement. Once all objects/wires have been placed, then the process will end.

Specific embodiments may be implemented for different double patterning approaches and for different routing methodologies. The below description provides details for example embodiments that may be utilized generally for the line-by-space method and for a gridded router.

Embodiment Using the Line-by-Spacer Method

Figure 4B:
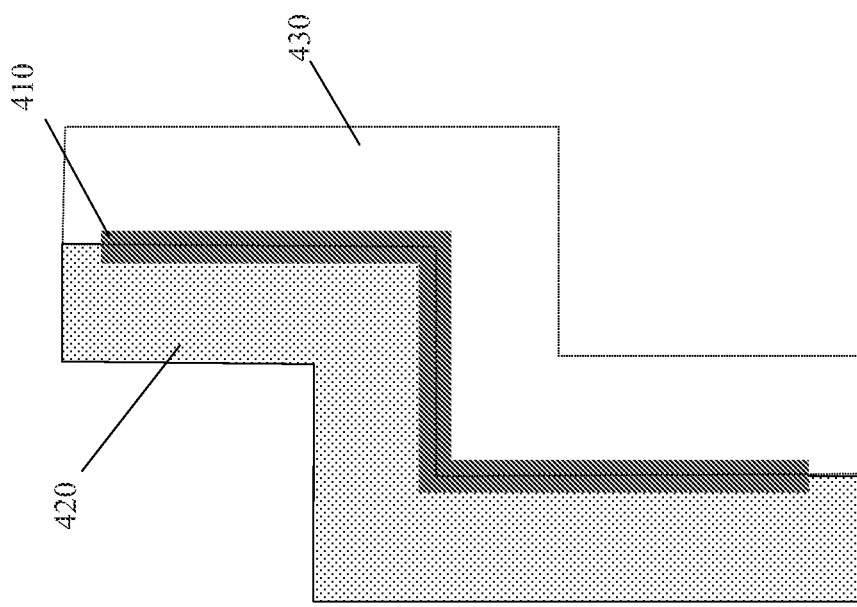
FIG. 4b show routing of a wire according to an embodiment of this invention.

According to this embodiment, wires can be in arbitrary directions and they need not have a constant pitch, although they have a substantially constant width. In line-by-spacer SADP, each metal line has a core feature (island) to one side, and no core on the other side. This is illustrated in FIG. 4*b*, where for each wire 410, there is a core feature 420 on one side of wire 410, and no core feature on the other side 430 of wire 410. Dimensions and pitch of such features 420 and 430 should be within the capability of a single lithography and a single etch step.

If all wires conform to this description, and core and non-core regions can be printed with a single lithography step, and the resulting pattern can be manufactured by line-by-spacer SADP method. To achieve this, a first wire 410 is placed together with two auxiliary polygons 420 and 430. The widths of polygons 420 and 430 add up to a pitch that can be resolved by a single lithography step. One of the auxiliary polygons is selected to be a core polygon and the other is selected to be a non-core polygon.

Now referring to FIG. 5*a-d*, a second wire 510 is placed with its auxiliary polygons 520 and 530. Placement of the second wire 510 is accepted only if the following four conditions are satisfied:
(i) at most one of the auxiliary polygons 520, 530 intersects a polygon that has previously been designated a core polygon; and
(ii) at most one of the auxiliary polygons 520, 530 intersects a polygon that has previously been designated a non-core polygon; and
(iii) polygon 520 does not intersect a first polygon that has previously been designated a core polygon and a second polygon that has previously been designated a non-core polygon; and
(iv) polygon 530 does not intersect a first polygon that has previously been designated a core polygon and a second polygon that has previously been designated a non-core polygon.

Figure 5A:
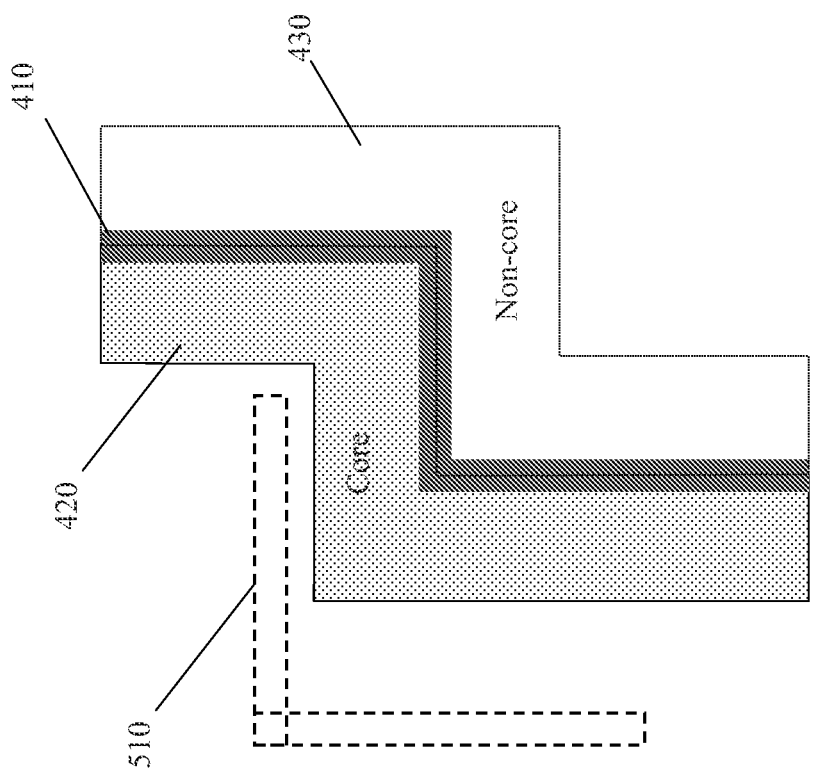
FIG. 5a-d show routing of interconnections according to an embodiment of this invention.
Figure 5B:
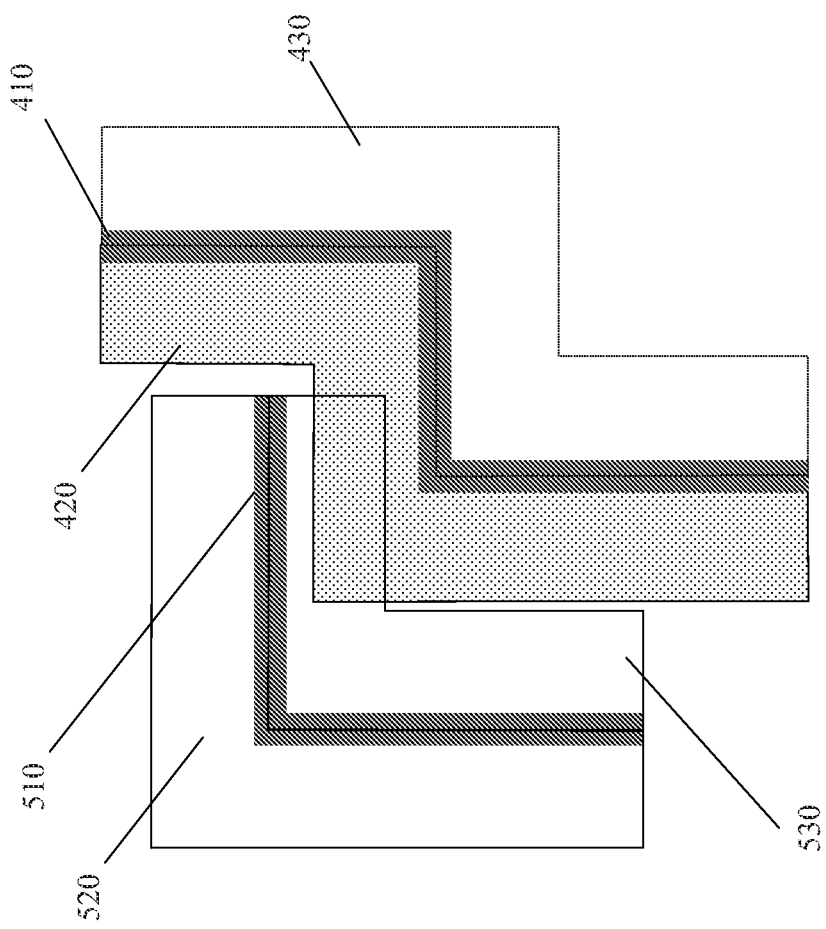
Figure 5C:
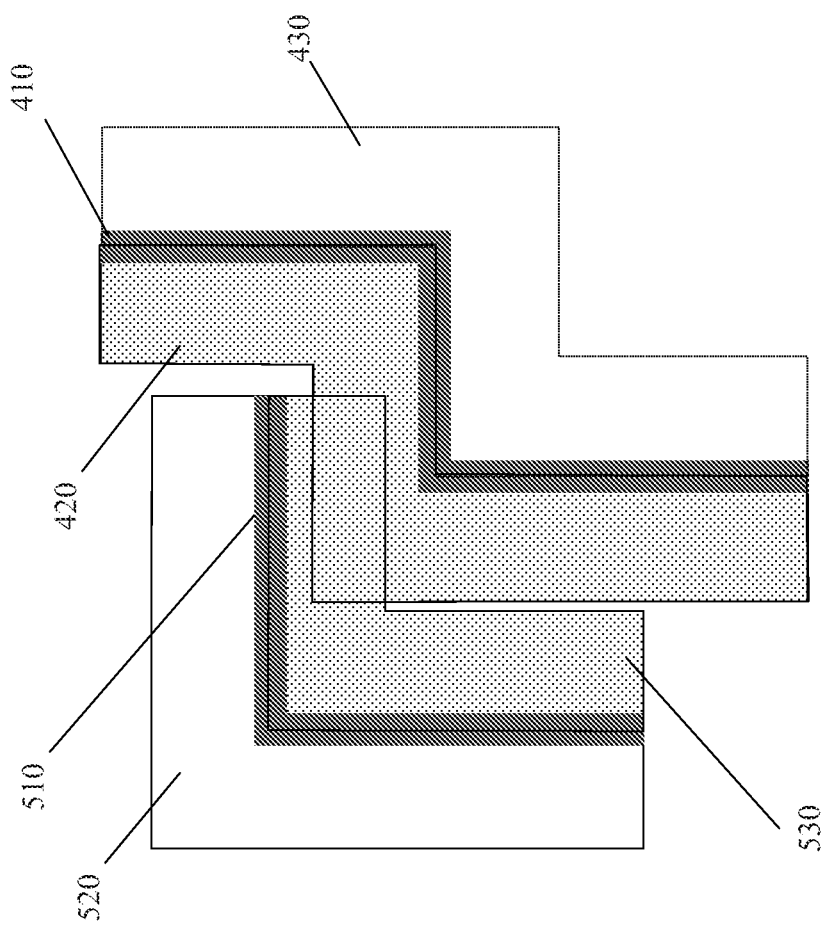
Figure 5D:
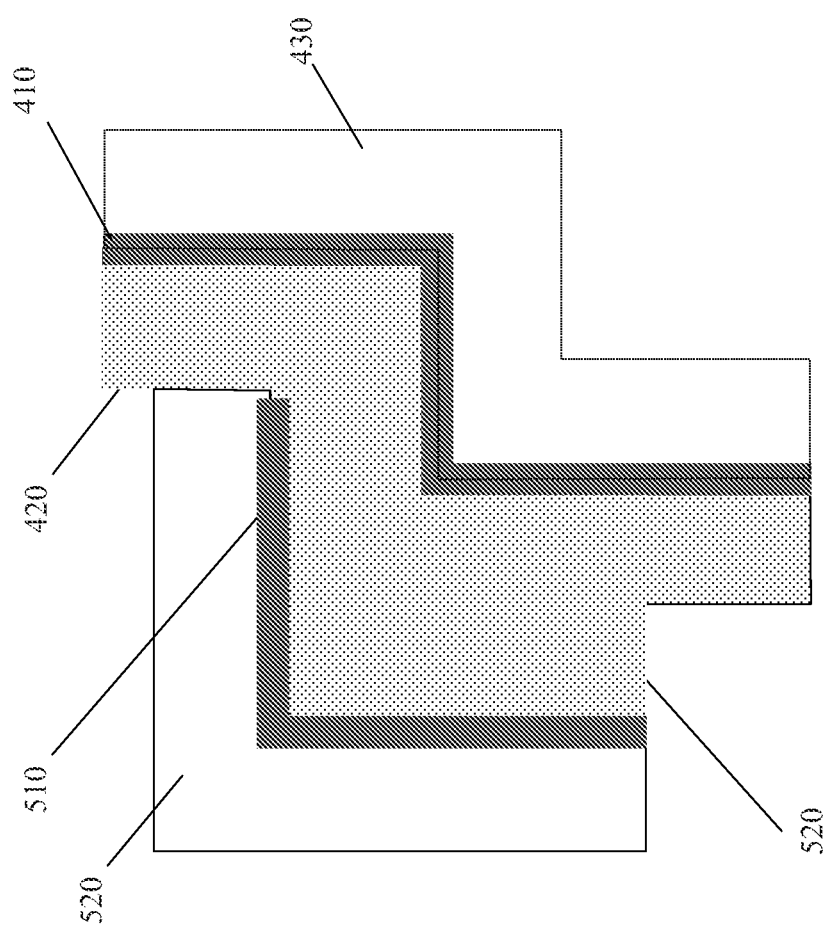

If routing of wire 510 is rejected, it is re-routed until (i), (ii), (iii), and (iv) are satisfied. In the example of FIG. 5*a-d*, auxiliary polygon polygon 530 intersects polygon 420 that has previously been designed a core polygon. Then, 530 is selected to be a core polygon; and 520, the other auxiliary polygon of wire 510, is designated a non-core polygon FIG. 5*c*). A gap between auxiliary polygons is eliminated if the gap is narrower than a minimum pitch that can be produced by the SADP process. When a gap is eliminated, un-like polygons (core and non-core) are abutted, and like polygons (core and core, or non-core and non-core) are merged (FIG. 5*d*). When routing is completed, if there are no other objects between two core polygons, the space between the two polygons can be made core and the two polygons and the region between them can be merged into one core polygon.

Embodiment for a Gridded Router and Line-by-Spacer SADP

Figure 6A:
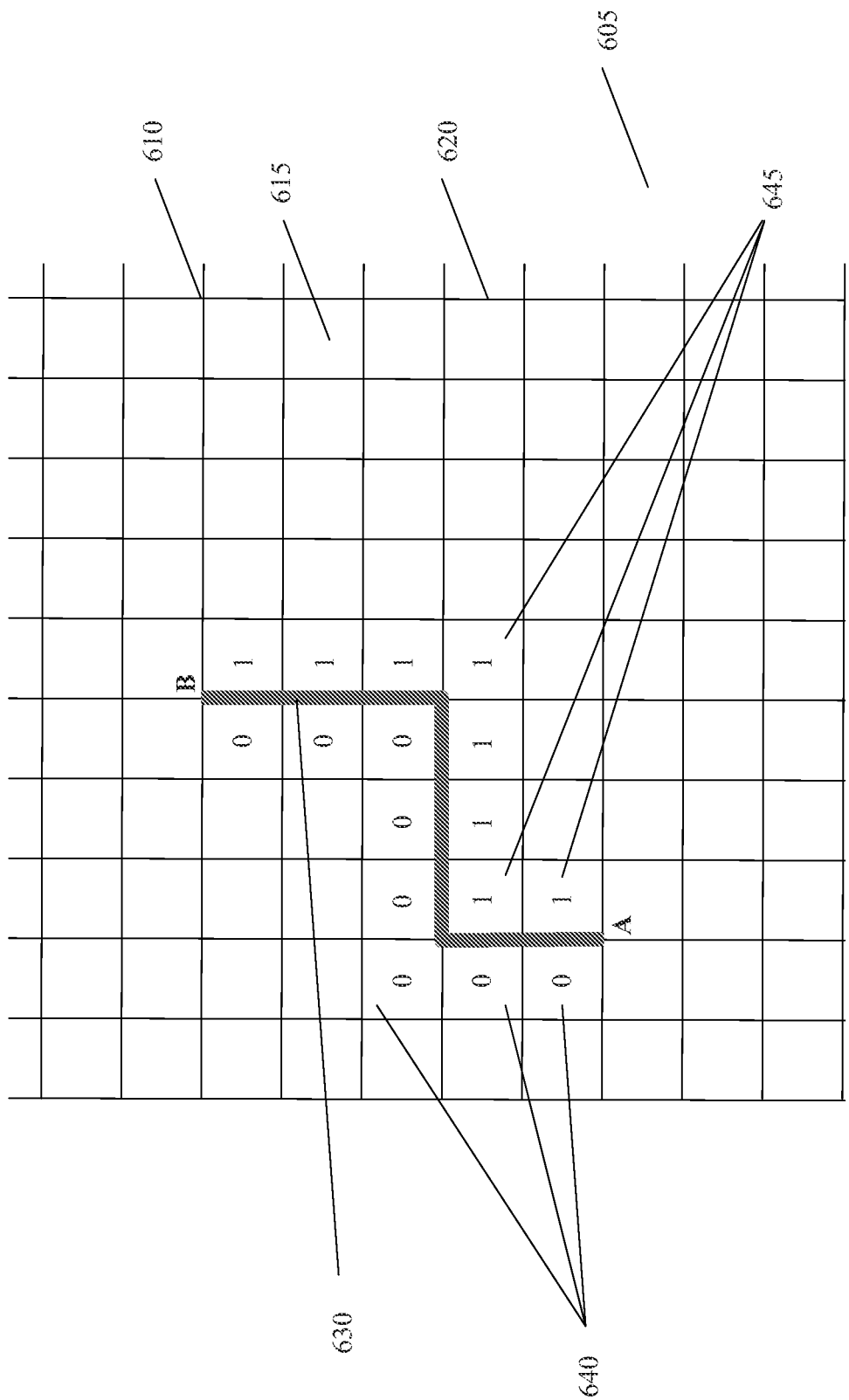

Consider a gridded router illustrated in FIG. 6*a*. This figure shows a design grid 605 comprising vertical and horizontal grid lines. Wires are to be routed along the grid lines. Intersection 610 of a vertical and a horizontal grid lines can be called a grid point. Four neighboring grid points define the vertices of a rectangle. Such a rectangle 615 can be called a mesh-rectangle. At this step, one can imagine the wire as having zero width, i.e., a straight or a zig-zag line along the grid lines, possibly making 90-degree turns at some grid points. A wire can be routed along +x, +y, −x, or −y directions. As a wire is traversed from one end of the wire, grid point-A, to the other end of the wire, grid point-B, there is a right and the left side of the wire.

Selection of direction of traversing, hence the right and left side of the wire, are arbitrarily assigned to each wire. To each mesh-rectangle, the router assigns one of four states: 0, 1, un-assigned, in-conflict. Initially, before routing starts, all mesh-rectangles are in the un-assigned state. A mesh-rectangle touches the wire if the wire goes through a vertex of the rectangle.

Let L be the set of mesh rectangles that touch the wire and that are on the left of the wire; and let R be the set of mesh-rectangles that touch the wire and that are on the right of the wire. When a wire 630 is placed, it affects the state of the mesh-rectangles in L and R in the following way:
a) If any of the mesh-rectangles in L has previously been set to state 0 (1), then all mesh-rectangles in L are set to 0 (1) and all mesh-rectangles in R are set to 1 (0);
b) If any of the mesh-rectangles in R has previously been set to state 0 (1), then all mesh-rectangles in R are set to 0 (1) and all mesh-rectangles in L are set to 1 (0);
c) If either step (a) or (b) changes the state of a mesh-rectangle from 0 to 1 or from 1 to 0, the state of that mesh rectangle is set to "in-conflict".

In an embodiment of this invention, if a mesh-rectangle becomes in-conflict when a wire is placed, the wire is removed, the states of the mesh-rectangles are restored to their previous states, and the wire is re-routed. In another embodiment of this invention, the router seeks to minimize a cost function. The number of mesh-rectangles in-conflict is added to the cost function with a weight factor. Minimizing the cost function with respect to the configuration of the routed wires avoids putting mesh-rectangles in conflict.

Figure 6B:
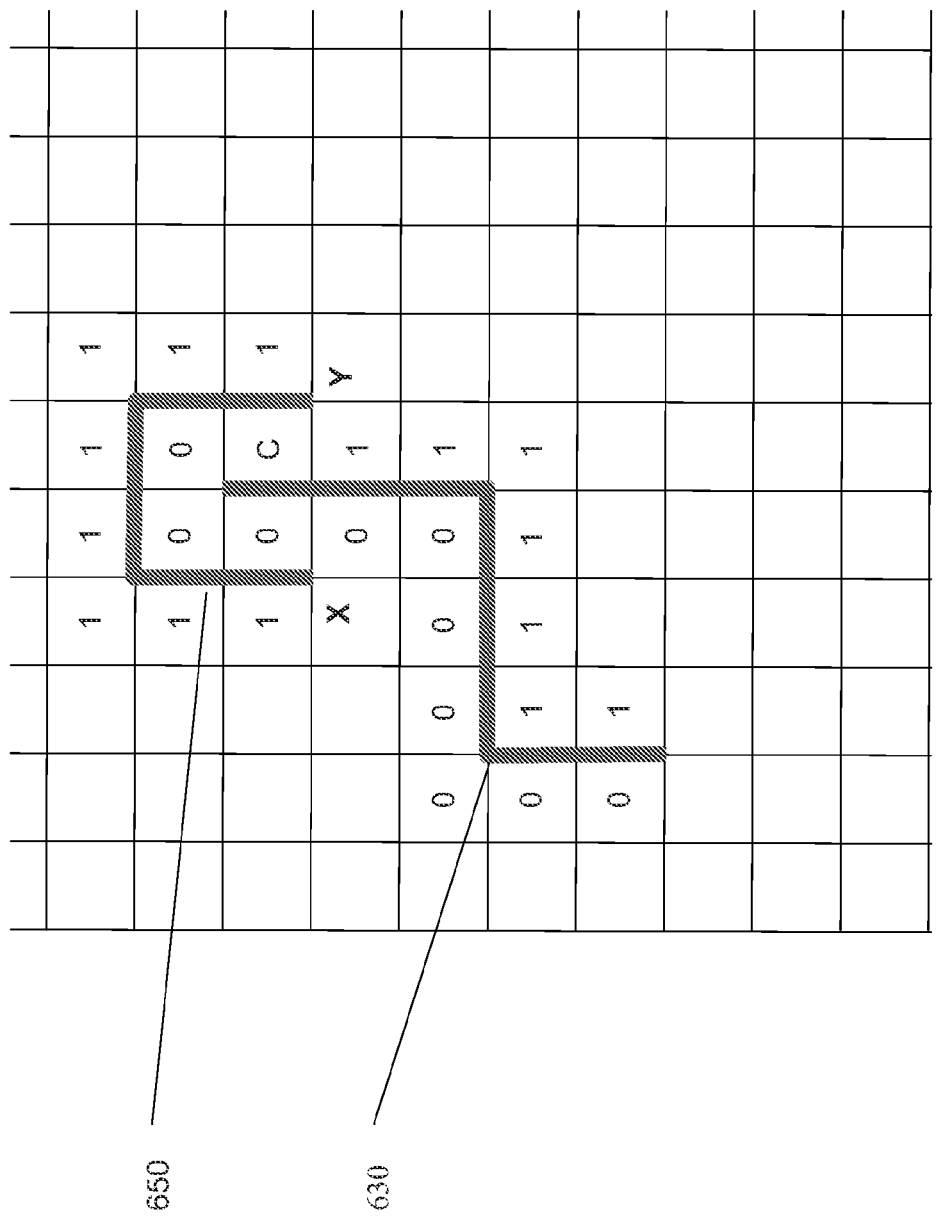

FIG. 6b shows an example of a first wire 630 and a second wire 650 connecting grid points X and Y. In this example, placing the second wire 650 puts the mesh-rectangles marked "C" in conflict. Therefore, the placement of wire 650 shown in FIG. 6b is rejected.

Figure 6C:
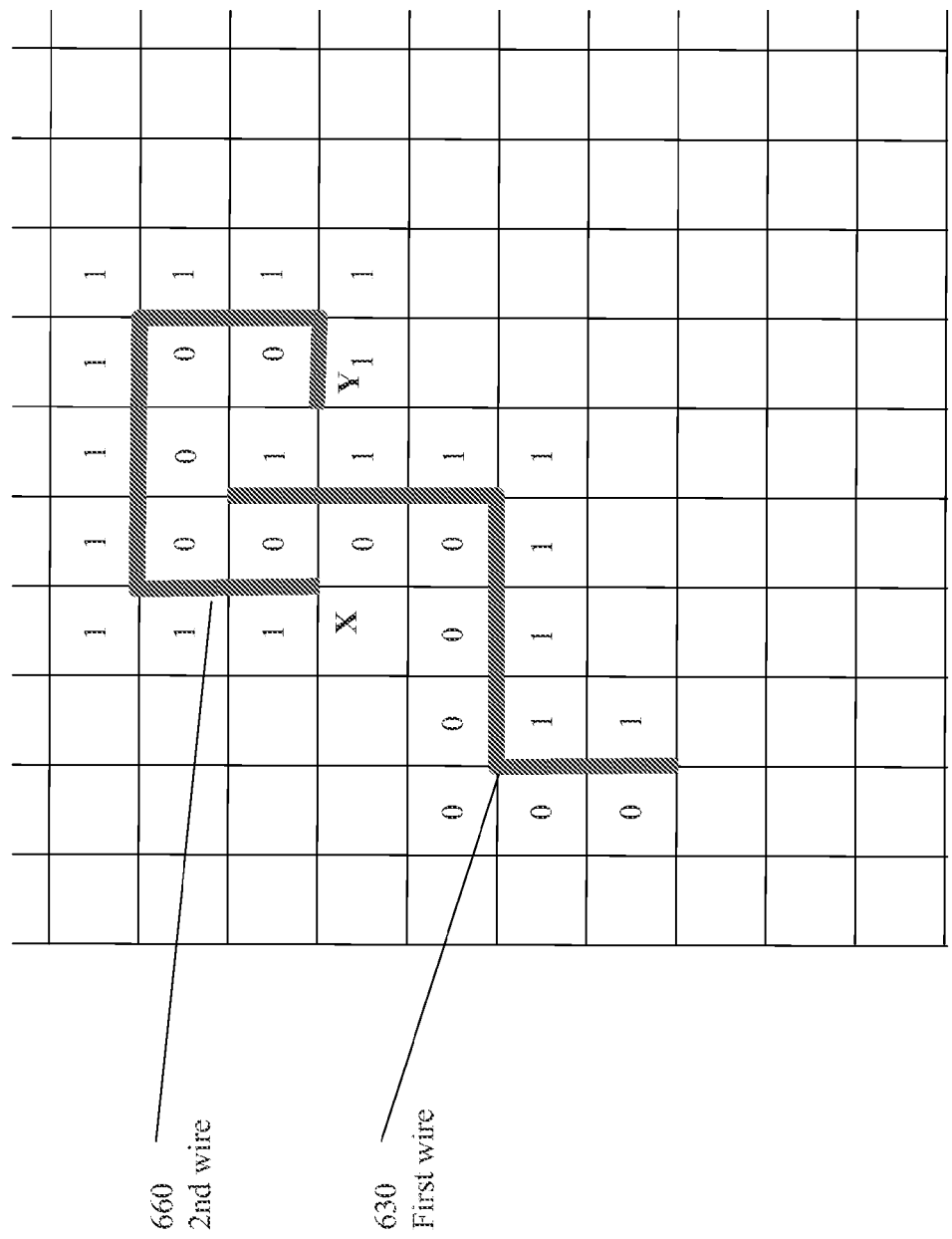
Figure 6D:
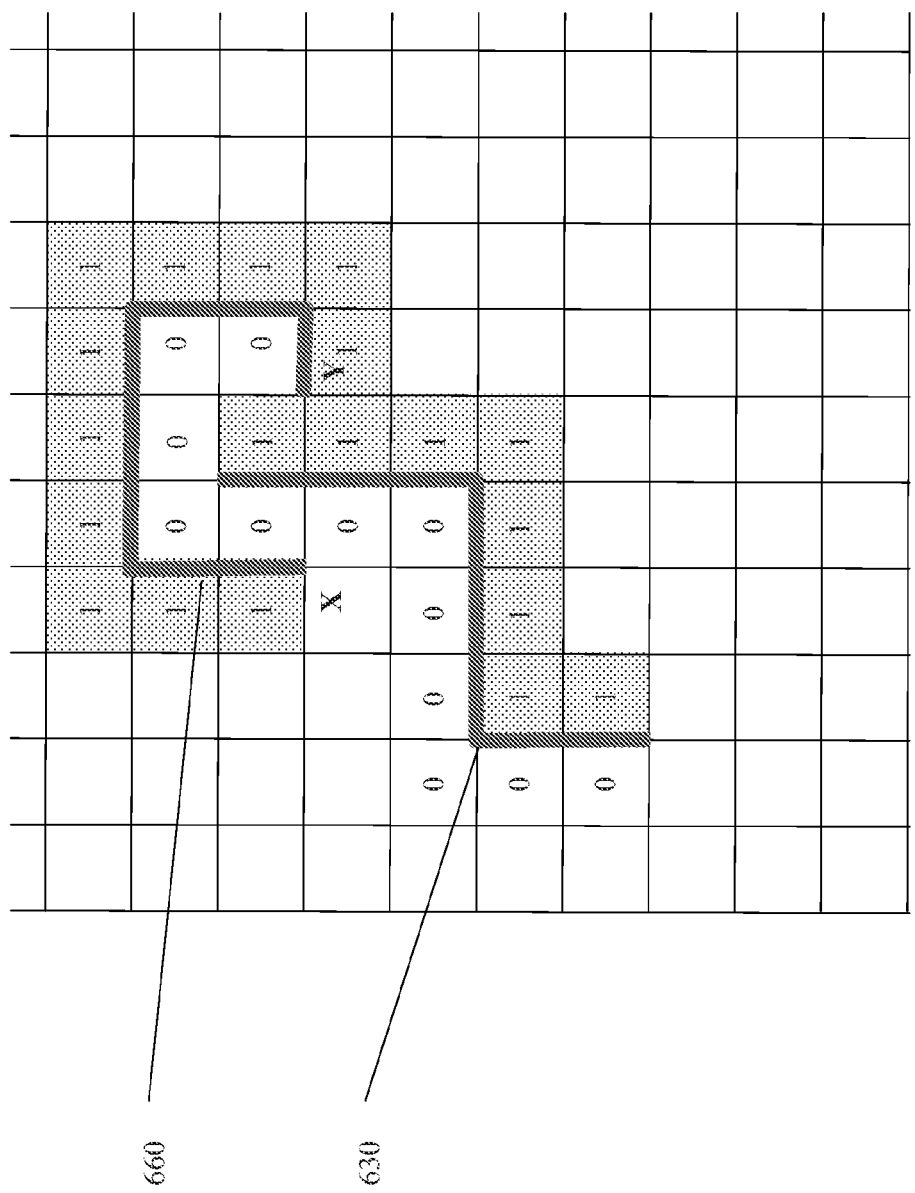
Figure 6C:
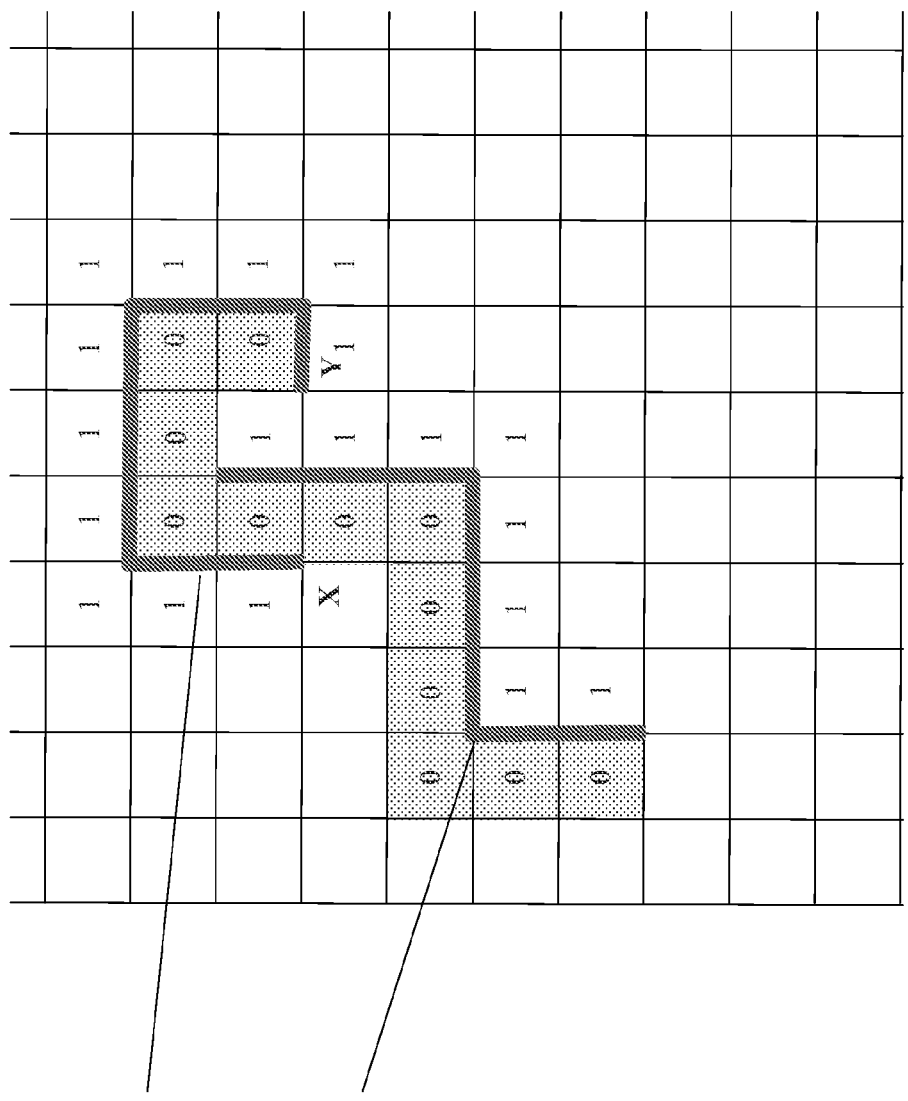

FIG. 6c shows an alternative route to connect grid points X and Y, wherein the alternative route doesn't put any mesh rectangles in conflict. When routing is finished, the union of mesh-rectangles in state 1 becomes the core (mandrel) pattern (FIG. 6d). Alternatively, the union of mesh-rectangles in state 0 becomes the core (mandrel) pattern (FIG. 6e).

Figure 6F:
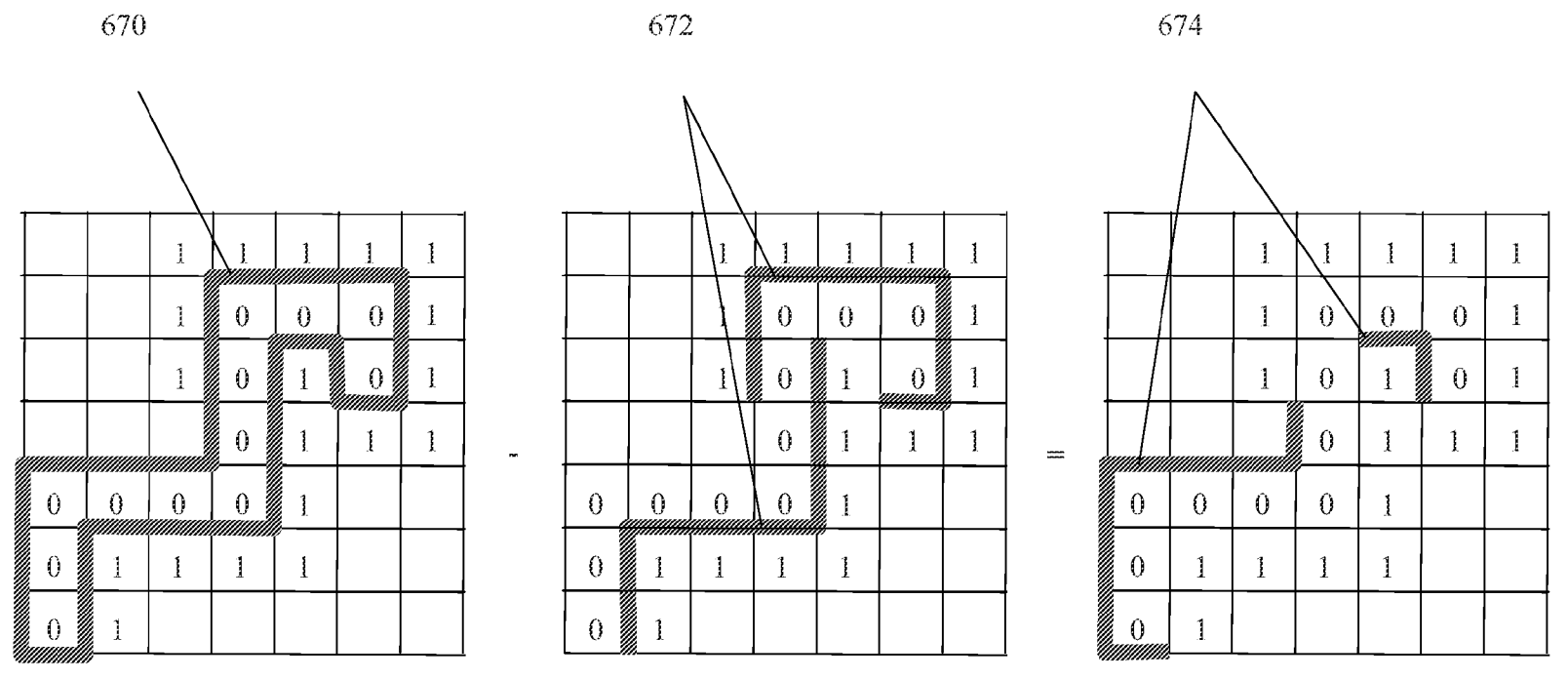

Now referring to FIG. 6f, the trim mask is defined by the set-difference (A-B) 674 of the following two sets: (A) the union 670 of all grid lines which have state 0 on one side and state 1 on the other side; (B) the union 672 of grid lines that are wires.

When a wire of index (label) n is routed, and all mesh-rectangles in the sets L and R defined above are unassigned, then mesh-rectangles in L are marked as belonging to (n,L), and all mesh-rectangles in R are marked as belonging to (n,R). This means, the index of the wire (n) is stored at memory locations allocated to represent mesh-rectangles in the sets L and R. Furthermore, a Boolean flag indicating L or R is stored for each mesh-rectangle in L or R, respectively. Later on, if one of the mesh-rectangles in (n,L) is set to 0 (1), all mesh-rectangles in (n,L) are set to 0 (1), and all mesh-rectangles in (n,R) are set to 1 (0). If when routing is finished, members of sets (n,L) and (n,R) have not been assigned 0 or 1, they can be arbitrarily assigned such as: (n,L)→0 and (n,R)→1 or vice-versa.

Extending the sets L and R by multiple mesh-rectangles past the end points of a wire renders lithography of the core mask and the trim mask easier (higher yield) but reduces the chances of the router completing the routing with no conflicts.

Resolving a Class of Conflicts

In an embodiment, when routing a new wire causes a conflict, a check is performed if the conflict is resolvable. Certain classes of conflicts are resolvable.

Figure 7:
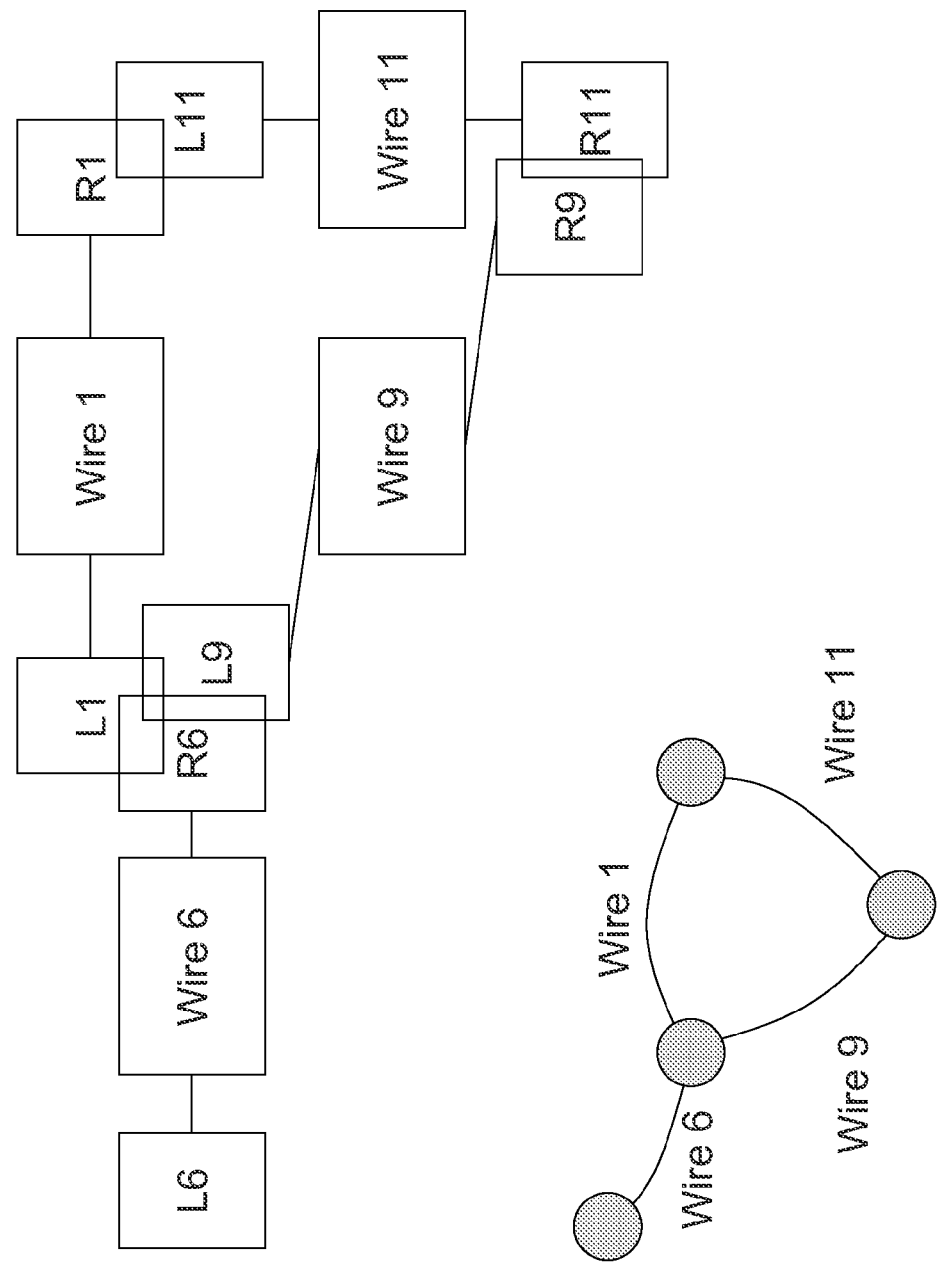
FIG. 7 shows a graph representing relationships of routed wires according to an embodiment of this invention.

To appreciate this, consider a graph formed by lines and their associated L and R polygons as shown in FIG. 7. Wires are the edges of the graph. The nodes of the graph are unions of pair-wise intersecting L and R polygons. According to this graph, an edge (a wire) doesn't connect the two end points of the wire but it connects its left and right polygons. As routing progresses, the graph is updated.

If the graph has an isolated subgraph, the core and non-core designations (0/1) of its L and R polygons can be swapped. If the last routed wire causes a conflict, and if the conflict is limited to a node of an isolated subgraph, then swapping the core and non-core designations in the subgraph will remove the conflict.

Figure 8B:
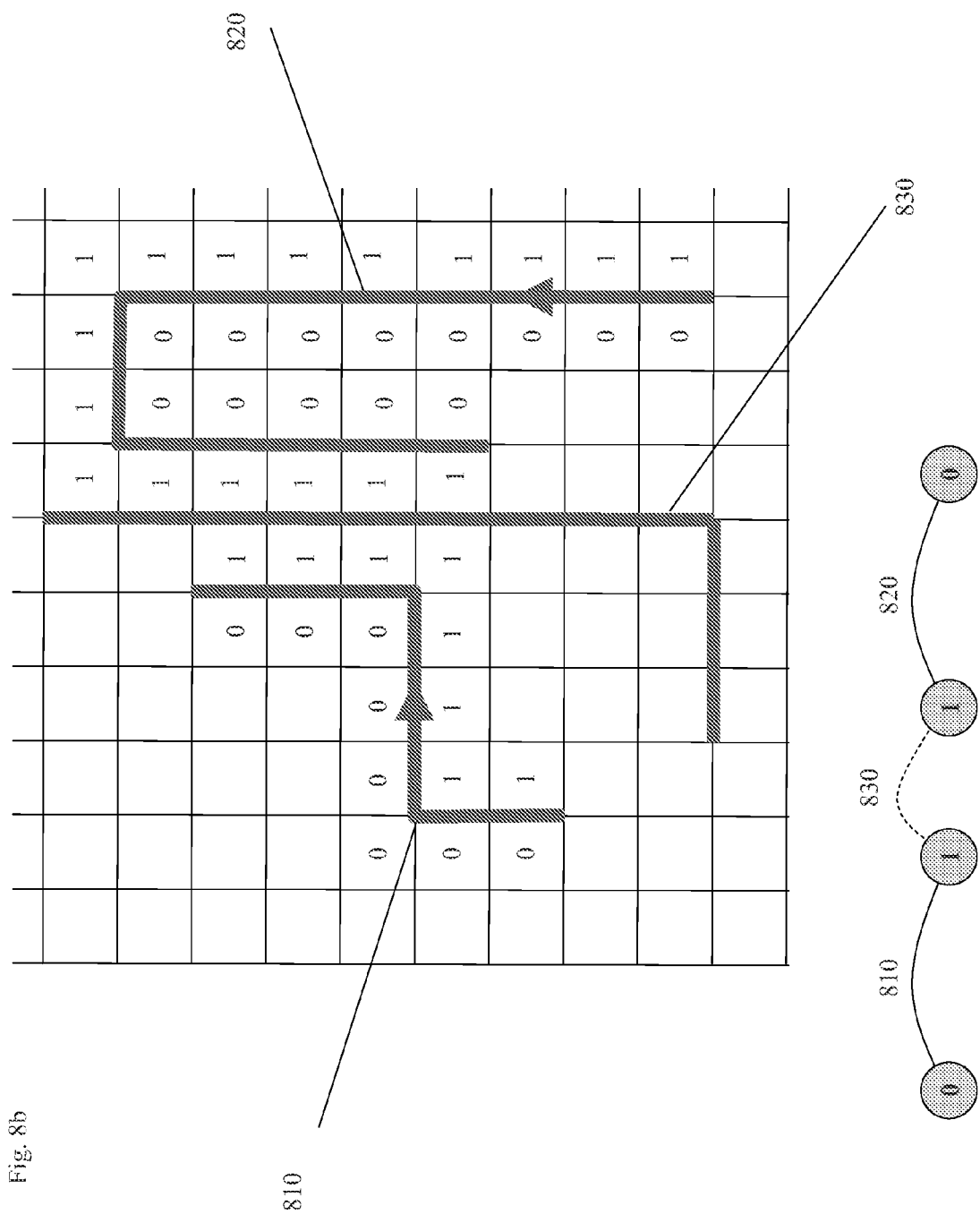
Figure 8C:
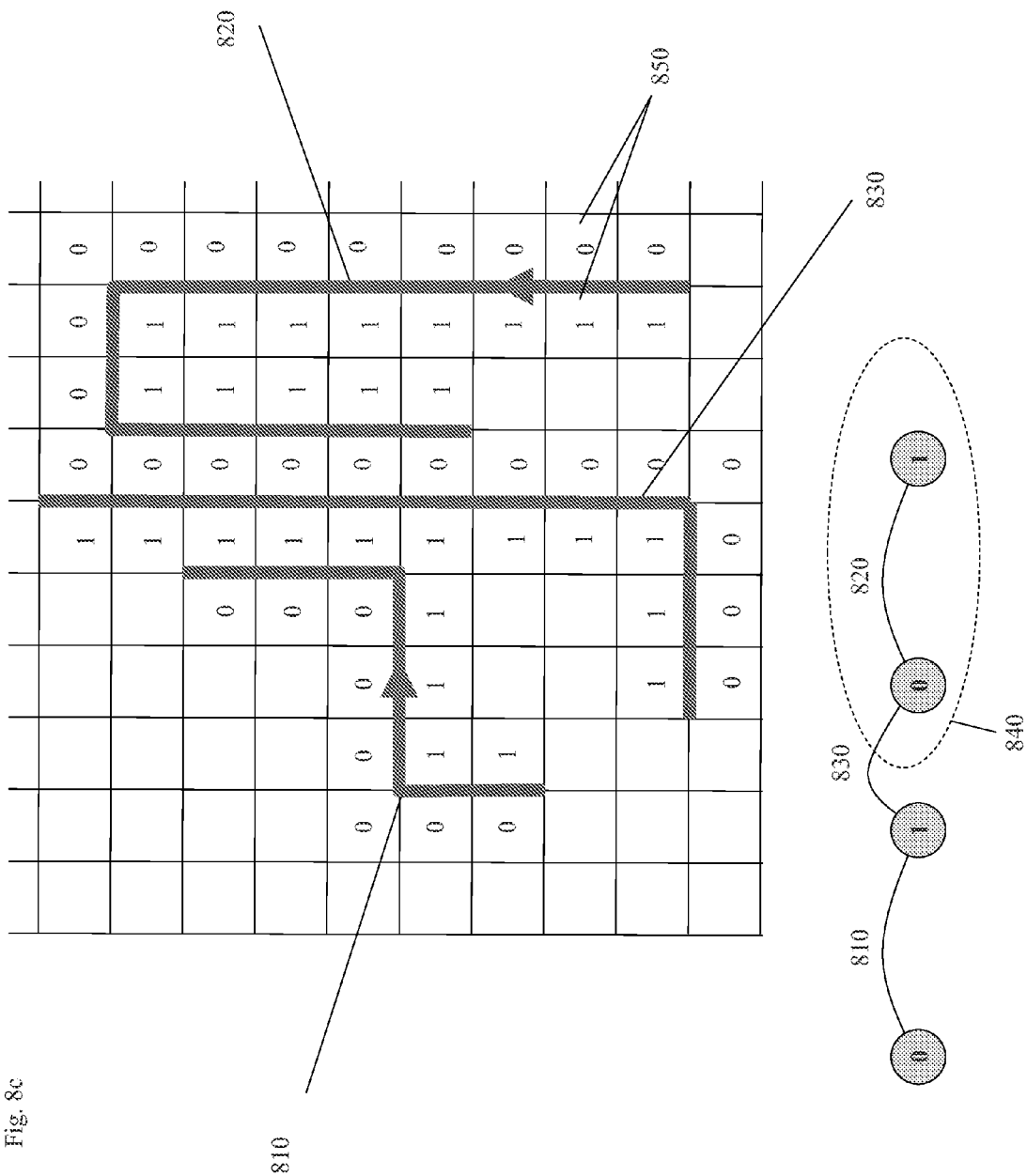

This is illustrated in FIG. 8a-c. Wires 810 and 820 in FIG. 8a make up two disjoint subgraphs. A track 830 is available between 810 and 820 for routing another connection (FIG. 8b). However, routing wire 830 will cause conflicts according to (i)-(ii) or (vii). This conflict is resolvable since the subgraphs joined by 830 are disjoint. Swapping the 0 and 1 assignments (which map to core and non-core assignments) of subgraph 840 resolves the conflict (FIG. 8c). The contents of mesh rectangles 850 are inverted as a result of swapping.

System Architecture Overview

Figure 9:
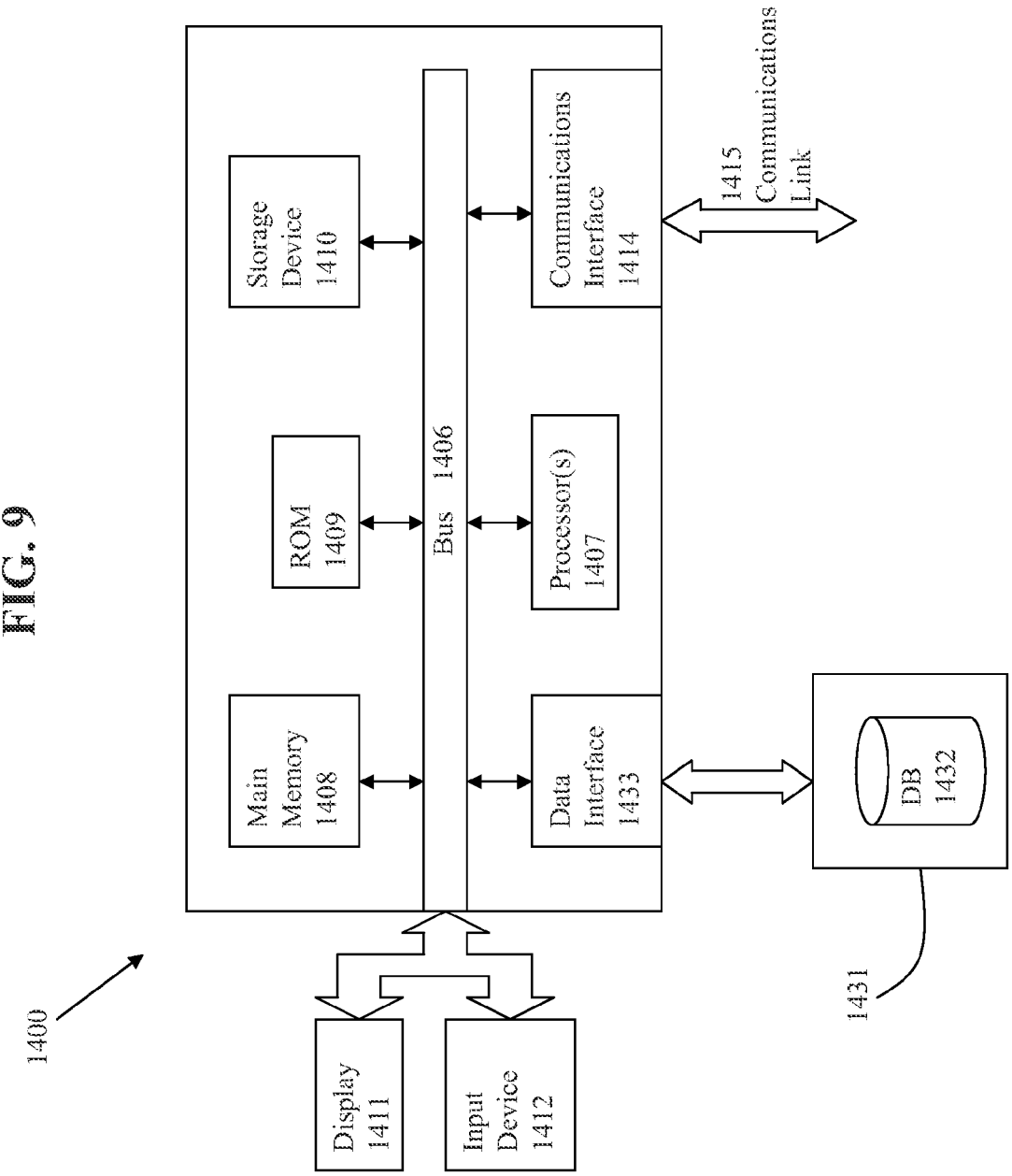
FIG. 9 is a block diagram of a computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What I claim is:

1. A computer implemented method for routing an electronic circuit design manufactured with sidewall image transfer processes that is correct by construction, the method implemented with at least one processor, the method comprising:

using the at least one processor of a computing system to perform a process, the process comprising:

identifying an object which is to be physically implemented in a layout of the electronic circuit design; and generating a physical implementation including placement or routing for the object that is correct by construction based at least in part upon a number of regions adjacent to a sidewall and whether the number of regions intersects a core polygon or a non-core polygon by at least identifying a possible placement for the object in the layout and determining whether the possible placement for the object in the layout creates a manufacturing conflict with sidewall image transfer manufacturing techniques for the object when the object is to be manufactured with the sidewall image transfer manufacturing techniques, wherein the layout is modified to resolve the manufacturing conflict with the sidewall image transfer manufacturing techniques if the manufacturing conflict is determined to exist during the physical implementation for the object, and the physical implementation for the object is correct by construction in that the process disallows physical implementations that lead to unsuccessful manufacturing of the object with a sidewall image transfer technique upon completion of the physical implementation for the object.

2. The computer implemented method of claim 1 in which the layout is modified to resolve the conflict by undoing the possible placement of the object and re-routing the object.

3. The computer implemented method of claim 1 in which a determination is made whether the conflict is resolvable without re-routing the object; and resolving the conflict without re-routing if possible.

4. The computer implemented method of claim 3 in which core and non-core designations are switched to resolve the conflict.

5. The computer implemented method of claim 1 implemented as an iterative process.

6. The computer implemented method of claim 1 in which the conflict is identified based upon identification of a rules violation, wherein the rules violation relates to placement of core or non-core features.

7. The computer implemented method of claim 6 in which the rules violation is based at least in part upon one or more of (a) if at most one of either two first regions adjacent to a first sidewall intersects a first polygon that has previously been designated a core polygon; (b) at most one of either two second regions adjacent to a second sidewall intersects a second polygon that has previously been designated a non-core polygon; and (c) a region adjacent to a third sidewall does not intersect the first polygon that has previously been designated the core polygon and the second polygon that has previously been designated the non-core polygon.

8. The computer implemented method of claim 7 in which conditions (a), (b), and (c) are all satisfied to avoid the conflict.

9. The computer implemented method of claim 7 in which a line-by-space double patterning process is implemented.

10. The computer implemented method of claim 6 in which wires are routed along a grid that defines mesh-rectangles, and further comprising:

(i) assigning a state represented by 0, 1, un-assigned, or in-conflict, wherein L represents a set of mesh rectangles that touch a wire and are on the left of the wire and R represents a set of mesh-rectangles that touch the wire and are on the right of the wire;

(ii) if any of the mesh-rectangles in L has previously been set to a state 0 or 1, then all mesh-rectangles in L are set to the same state 0 or 1 and all mesh-rectangles in R are set to an opposite state 1 or 0; and (iii) if any of the mesh-rectangles in R has previously been set to a state 0 or 1, then all mesh-rectangles in R are set to the same state 0 or 1 and all mesh-rectangles in L are set to an opposite state 1 or 0.

11. The computer implemented method of claim 10 in which if either (ii) or (iii) changes the state of a mesh-rectangle from 0 to 1 or from 1 to 0, then the state of that mesh rectangle is set to "in-conflict" to represent identification of the conflict.

12. The computer implemented method of claim 11 in which the conflict is resolved based upon minimization of a cost function, wherein the number of mesh-rectangles in-conflict are considered in the cost function along with a weighting factor.

13. A system for routing an electronic circuit design manufactured with sidewall image transfer processes that is correct by construction, the system implemented with a processor, comprising:

at least one processor of a computing system that is to:

identify an object which is to be physically implemented in a layout of the electronic circuit design; and generate a physical implementation including placement or routing for the object that is correct by construction based at least in part upon a number of regions adjacent to a sidewall and whether the number of regions intersects a core polygon or a non-core polygon by at least identifying a possible placement for the object in the layout and determining whether the possible placement for the object in the layout creates manufacturing conflict with sidewall image transfer manufacturing techniques for the object when the object is to be manufactured with sidewall image transfer manufacturing techniques, wherein the layout is modified to resolve the conflict with the sidewall image transfer manufacturing techniques if the manufacturing conflict is determined to exist during the physical implementation for the object, and the physical implementation for the object is generated to be correct by construction in that the at least one processor that is to generate the physical implementation for the object disallows physical implementations that lead to unsuccessful manufacturing of the object with a sidewall image transfer technique upon completion of the physical implementation for the object.

14. The system of claim 13 in which the layout is modified to resolve the conflict by undoing the possible placement of the object and re-routing the object.

15. The system of claim 13 in which a determination is made whether the conflict is resolvable without re-routing the object; and resolving the conflict without re-routing if possible.

16. The system of claim 15 in which core and non-core designations are switched to resolve the conflict.

17. The system of claim 13 implemented as an iterative process.

18. The system of claim 13 in which the conflict is identified based upon identification of a rules violation, wherein the rules violation relates to placement of core or non-core features.

19. The system of claim 18 in which the rules violation is based at least in part upon (a) if at most one of either two regions adjacent to a sidewall intersects a polygon that has previously been designated a core polygon; (b) at most one of either two regions adjacent to a sidewall intersects a polygon that has previously been designated a non-core polygon; and (c) a region adjacent to a sidewall does not intersect a first polygon that has previously been designated a core polygon and a second polygon that has previously been designated a non-core polygon.

20. The system of claim 19 in which conditions (a), (b), and (c) are all satisfied to avoid the conflict.

21. The system of claim 19 in which a line-by-space double patterning process is implemented.

22. The system of claim 18 in which wires are routed along a grid that defines mesh-rectangles, and the at least one processor is further to:
   (i) assign a state represented by 0, 1, un-assigned, or in-conflict, wherein L represents a set of mesh rectangles that touch a wire and are on the left of the wire and R represents a set of mesh-rectangles that touch the wire and are on the right of the wire;
   (ii) set all mesh-rectangles in L to the same state 0 or 1 and all mesh-rectangles in R to an opposite state 1 or 0 if any of the mesh-rectangles in L has previously been set to a state 0 or 1;
   (iii) set all mesh-rectangles in R to the same state 0 or 1 and all mesh-rectangles in L to an opposite state 1 or 0 if any of the mesh-rectangles in R has previously been set to a state 0 or 1.

23. The system of claim 22 in which if either (ii) or (iii) changes the state of a mesh-rectangle from 0 to 1 or from 1 to 0, then the state of that mesh rectangle is set to "in-conflict" to represent identification of the conflict.

24. The system of claim 23 in which the conflict is resolved based upon minimization of a cost function, wherein the number of mesh-rectangles in-conflict are considered in the cost function along with a weighting factor.

25. A computer program product embodied on a non-transitory computer usable medium, the non-transitory computer readable medium having stored thereon a sequence of instructions which, when executed by a processor causes the processor to execute a method for routing an electronic circuit design manufactured with sidewall image transfer processes that is correct by construction, the method comprising: using at least one processor of a computing system to perform a process, the process comprising:
identifying an object which is to be physically implemented in a layout of the electronic circuit design; and
generating a physical implementation including placement or routing for the object that is correct by construction based at least in part upon a number of regions adjacent to a sidewall and whether the number of regions intersects a core polygon or a non-core polygon by at least identifying a possible placement for the object in the layout and determining whether the possible placement for the object in the layout creates manufacturing conflict with sidewall image transfer manufacturing techniques for the object when the object is to be manufactured with the sidewall image transfer manufacturing techniques, wherein
   the layout is modified to resolve the manufacturing conflict with the sidewall image transfer manufacturing techniques if the manufacturing conflict is determined to exist during the physical implementation for the object, and
   the physical implementation for the object is correct by construction in that the process disallows physical implementations that lead to unsuccessful manufacturing of the object with a sidewall image transfer technique upon completion of the physical implementation for the object.

26. The computer program product of claim 25 in which the layout is modified to resolve the conflict by undoing the possible placement of the object and re-routing the object.

27. The computer program product of claim 25 in which a determination is made whether the conflict is resolvable without re-routing the object; and resolving the conflict without re-routing if possible.

28. The computer program product of claim 27 in which core and non-core designations are switched to resolve the conflict.

29. The computer program product of claim 25 implemented as an iterative process.

30. The computer program product of claim 25 in which the conflict is identified based upon identification of a rules violation, wherein the rules violation relates to placement of core or non-core features.

* * * * *